US009428397B2

(12) United States Patent
Rhamim

(10) Patent No.: US 9,428,397 B2
(45) Date of Patent: Aug. 30, 2016

(54) PROCESS FOR PRECIPITATION OF CARNALLITE FROM AQUEOUS SOLUTIONS

(71) Applicant: Dead Sea Works Ltd., Beer Sheva (IL)

(72) Inventor: Shai Rhamim, Omer (IL)

(73) Assignee: DEAD SEA WORKS LTD., Beer Sheva (IL)

( * ) Notice: Subject to any disclaimer, the term of this patent is extended or adjusted under 35 U.S.C. 154(b) by 0 days.

(21) Appl. No.: 14/775,702

(22) PCT Filed: Mar. 13, 2014

(86) PCT No.: PCT/IL2014/050278
§ 371 (c)(1),
(2) Date: Sep. 13, 2015

(87) PCT Pub. No.: WO2014/141275
PCT Pub. Date: Sep. 18, 2014

(65) Prior Publication Data
US 2016/0031716 A1 Feb. 4, 2016

Related U.S. Application Data

(60) Provisional application No. 61/784,140, filed on Mar. 14, 2013.

(51) Int. Cl.
*C22B 1/14* (2006.01)
*C01F 5/30* (2006.01)
*C01D 3/06* (2006.01)

(52) U.S. Cl.
CPC .. *C01F 5/30* (2013.01); *C01D 3/06* (2013.01)

(58) Field of Classification Search
CPC ................................. C22B 1/14; C05B 19/00
USPC ........................................................ 23/313 R
See application file for complete search history.

(56) References Cited

U.S. PATENT DOCUMENTS

2011/0064853 A1* 3/2011 Maki ....................... A23L 1/237
426/97
2011/0123420 A1 5/2011 Phinney

FOREIGN PATENT DOCUMENTS

WO 2012109723 A1 8/2012

OTHER PUBLICATIONS

Unit Operations in Food Processing—R. L Earle, 1983, NZIFST, http://www.nzifst.org.nz/unitoperations/evaporation2.htm.
Written Opinion of the International Search Authority for parent PCT application PCT/IL2014/050278, mailed Sep. 14, 2015.

* cited by examiner

*Primary Examiner* — Edward Johnson
(74) *Attorney, Agent, or Firm* — Graeser Associates International Inc; Dvorah Graeser

(57) ABSTRACT

There is provided a process for extracting Carnallite from an aqueous solution, the process comprising steps of pre-heating the solution comprising said Carnallite in a series of at least two heat exchangers, thereby obtaining a pre-heated solution; and concentrating said pre-heated solution in a series of at least two evaporation units, whereby forming a concentrated solution and hot vapors; wherein at least one of said evaporation units employs steam for indirect heating, and wherein at least one of said heat exchanger units employs the heat of said hot vapors formed in said evaporation units.

14 Claims, 3 Drawing Sheets

PROCESS FOR PRECIPITATION OF CARNALLITE FROM AQUEOUS SOLUTIONS

FIELD OF THE INVENTION

The present invention relates to processes for precipitation of Carnallite from aqueous solutions in general, and specifically from natural or industrial brines.

BACKGROUND OF THE INVENTION

Carnallite is an evaporite mineral, a hydrated potassium magnesium chloride with formula: $KMgCl_3 \cdot 6(H_2O)$. Carnallite usually forms in marine evaporite deposits where sea water has been concentrated and exposed to prolonged evaporation.

Carnallite precipitates with other potassium and magnesium evaporate minerals such as sylvite, kainite, picromerite, polyhalite and kieserite.

It is usually massive to fibrous with rare pseudohexagonal orthorhombic crystals. The mineral is deliquescent (absorbs moisture from the surrounding air) and specimens must be stored in an airtight container. Carnallite, being an important source of Potassium Chloride (also referred to herein as "KCl" or "Potash"), is an invaluable source for the production of synthetic fertilizers.

Carnallite may be extracted from natural brines, originating either from underground sources or from salty lakes. For example, US 2011/0123420A1 relates to a process for making carnallite.

The natural brines may precipitate the Carnallite in evaporation ponds, wherein the Carnallite is then harvested and sent to industrial plants for processing.

Further processing of the Carnallite in the plants is needed for extracting the KCl, during these processes, some of the Carnallite is dissolved resulting in side products, also known as, industrial brines. The industrial brines are usually sent back to re-precipitate Carnallite in the ponds.

However, sending back industrial brines to re-precipitate has several disadvantages as the brines are subject to seepage, their content does not fall exactly in character with the ponds brine (thus diluting the ponds solution) and they need to be re-harvested.

SUMMARY OF THE INVENTION

In some demonstrative embodiments, there is provided a process for extracting Carnallite from aqueous solutions, for example, natural or industrial brines.

In some demonstrative embodiments, the process may be used to increase the yield of the Carnallite production process wherein industrial brines are sent back to evaporation ponds ("the ponds") for the purpose of re-harvesting.

According to some embodiments, the process may include a multi stage evaporation of brines, e.g., brines containing at least KCl, $MgCl_2$, to enable the precipitation of solid Carnallite.

According to some embodiments, the process may include using a plurality of evaporators, flash chambers, cooler evaporators and optionally a mixture of brines, in order to improve the precipitation of the Carnallite.

According to some embodiments, the process described herein may obviate or diminish the need to re-harvest Carnallite from dissolved solutions (industrial brines) returned to the ponds.

According to some embodiments described herein, the process of the present invention may increase the yield, efficiency and flexibility of a Potash producing operation, e.g., by increasing the yield of Carnallite in the production. The process of the present invention aims to keep the industrial brines in the plants where they can undergo re-crystallization, thereby diminishing the risk of loss in seepage, and obviating the need to re-harvest the brines an the risk of diluting the ponds.

BRIEF DESCRIPTION OF THE DRAWINGS

The present invention will become fully understood from the detailed description given herein below and the accompanying drawings, which are given by way of illustration and example only, and thus not limiting in any way, wherein.

DETAILED DESCRIPTION OF THE INVENTION

Figure 1:
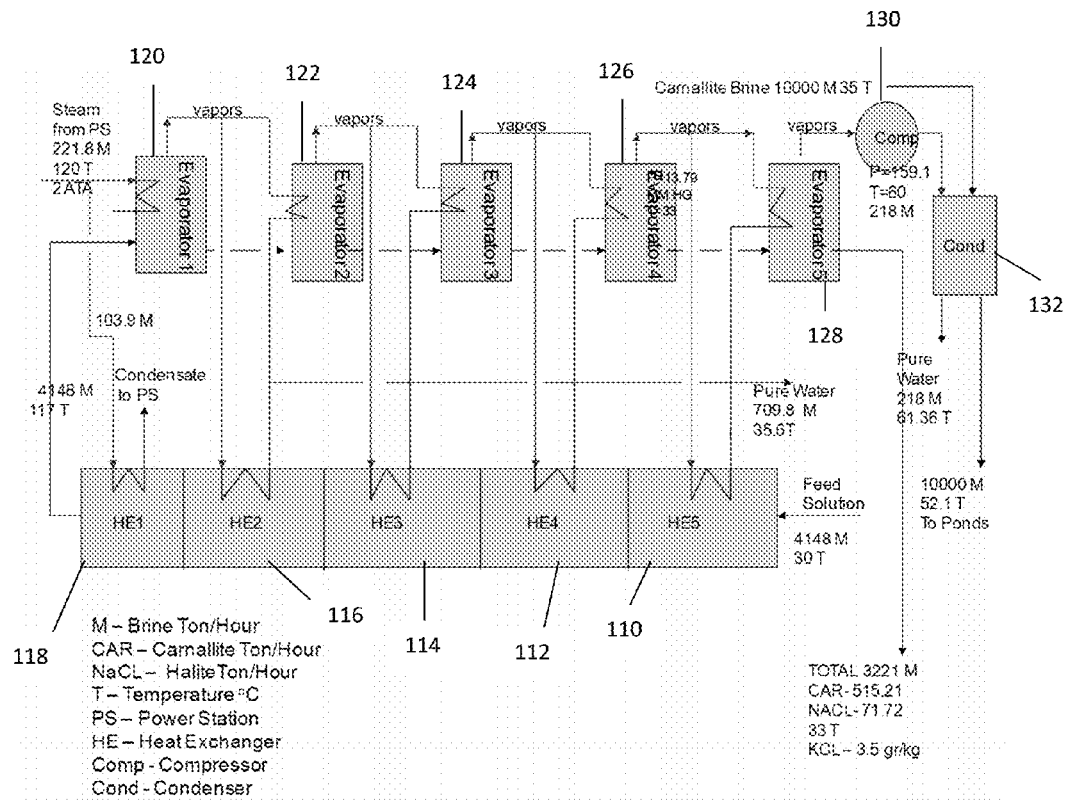
FIG. 1 demonstrates a flow chart describing a process utilizing a multi stage Evaporator with compressor and indirect condenser, according to some embodiments of the present invention.

In some demonstrative embodiments, there is provided a process for extracting Carnallite from aqueous solutions, for example, natural or industrial brines.

According to some embodiments, the process may include a multi stage evaporation of brines, e.g., brines containing at least KCl, $MgCl_2$, to enable the precipitation of solid Carnallite.

According to some embodiments, the process may include using a plurality of evaporators, flash chambers, cooler evaporators and optionally a mixture of brines, in order to improve the precipitation of the Carnallite.

According to some demonstrative embodiments of the present invention, the process may include evaporating natural and/or industrial brines ("source brine(s)") with the use of a multi stage evaporator.

Suitable evaporators may include, but not limited to, Natural/forced circulation evaporators, Falling film evaporators, Rising film (Long Tube Vertical) evaporators, Climbing and falling-film plate evaporators, Multiple-effect evaporators and the like.

In some demonstrative embodiments, the process may include the use of one or more Heat Exchangers. According to some embodiments, the Heat Exchanger may include any suitable equipment built for efficient heat transfer from one medium to another, including, for example, Shell and tube heat exchanger, Plate heat exchanger, Plate and shell heat exchanger, Adiabatic wheel heat exchanger, Plate fin heat exchanger, Pillow plate heat exchanger, Fluid heat exchangers, Waste heat recovery units, Dynamic scraped surface heat exchanger, Phase-change heat exchangers and the like.

In some demonstrative embodiments, the process may include the use of one or more flash chambers (also known as flash trap or flash vessel). According to some embodiments, the flash chamber may include any suitable separator operated at low pressure, with liquid from a higher-pressure vessel being flashed into it.

In some demonstrative embodiments, the process may include the use of one or more thickeners. According to some embodiments, the thickener any include any suitable device which is configured to enable the separation of at least two components, either a suspension, or dry granular mixture, wherein separating the components with gravity is sufficiently practical, e.g., when. the components of the mixture have different specific weight.

In some demonstrative embodiments, the process may include the use of one or more compressors. According to some embodiments, the compressor may include any suitable mechanical device that increases the pressure of a gas by reducing its volume, including, for example, Hermetically sealed, open, or semi-hermetic compressors, Centrifugal compressors, Diagonal or mixed-flow compressors, Axial-flow compressors, Reciprocating compressors, Rotary screw compressors, Rotary vane compressors, Scroll compressors, Diaphragm compressors, Air bubble compressor and the like.

In some demonstrative embodiments, the process may include the use of one or more condensers. According to some embodiments, the condenser may include any suitable device or unit used to condense a substance from its gaseous to its liquid state, including, for example, surface condensers, Direct contact condenser and the like.

In some demonstrative embodiments, the process may include one or more stages intended to save and/or "recycle" energy throughout the process. For example, according to some embodiments, the process may include n Evaporators and n Heat Exchangers, wherein the vapor from nth evaporator, except for the last one in the series, may heat the solution in the (n+1)th heat evaporator unit and (N−n−1)th heat exchanger unit.

Another example of energy saving properties of the process according to the present invention may include transferring of a natural brine, i.e., a Carnallite solution, through a condenser to assist in the process of condensing of vapors to water, wherein the Carnallite solution absorbs heat, and when poured back to the evaporation ponds may expedite the evaporation process.

Example 1

Reference is now made to FIG. 1 which depicts a flow chart describing a process utilizing a multi stage Evaporator with compressor and indirect condenser, according to some embodiments of the present invention.

As shown in FIG. 1 the process of the present invention may include feeding the source brine (also referred to herein as "F1 Solution" and/or "F2 Solution" and/or "solution") into Heat Exchanger (HE) 110, for example, at a rate of 4,148 Ton/Hour and at a temperature of 30° C., and further pumping the solution into a series of evaporators 112, 114, 116 and 118. The solution leaves evaporator 118 at a rate of 4,148 Ton/Hour and at a temperature of 117° C., and is fed into a series of evaporators, 120, 122, 124, 126 and 128.

Evaporator 120 is supplied with steam from a power station at 2 Atmospheres Absolute (ATA) and 120° C. to both HE 118 and evaporator 120, causing the evaporation of water (vapors) from the solution in evaporator 120.

The solution from evaporator 120 is transferred to evaporator 122, wherein vapors from evaporator 122 preheat the solution in HE 114 and Evaporator 122.

The solution from evaporator 122 is transferred to evaporator 124, wherein vapors from evaporator 124 preheat the solution in HE 112 and Evaporator 124.

The solution from evaporator 124 is transferred to evaporator 126, wherein vapors from evaporator 124 preheat the solution in HE 110 and Evaporator 126.

The process may also include the use of 3 flashers (not shown in the figure), wherein a first flasher reduces the temperature of condensate from Evaporator 122 and HE 116 from 98° C. to 78° C. A second flasher reduces the temperature of condensate from Evaporators 122 and 124 and HE 116 and 114 to 56° C. A third flasher reduces the temperature of condensate from Evaporators 122, 124 and 126 and HE 116, 114 and 112 to 35.6° C.

The solution from evaporator 126 is transferred to evaporator 128, wherein Evaporator 128 yields two different outcomes:

1. Vapors from Evaporator 128 are fed into compressor 130, and leave compressor 130 at a rate of 218 Ton/Hour and a temperature of 60° C., compressed to 160 Torr, to be fed to condenser 132, and are further used to heat a Carnallite brine (CB) solution which may be run through condenser 132. the CB is conveyed through condenser 132 without coming in contact with the vapors in condenser 132, e.g., via a separate tube.

The CB solution leaving the condenser at 52.1° C. and may be pumped back to the evaporation ponds, contributing to the increase of evaporation rate in the ponds.

2. Resultants, including the following properties:
   Final solution (also referred to herein as "EBF") solution, including KCL at about 3.5-4 g/kg w/w of the solution.
   Carnallite at a rate of 515.2 ton/hour
   NaCl, at a rate of 71.72 ton/hour
   Water at a rate of 927.8 Ton/Hour, at 38° C.

Example 2

Figure 2:
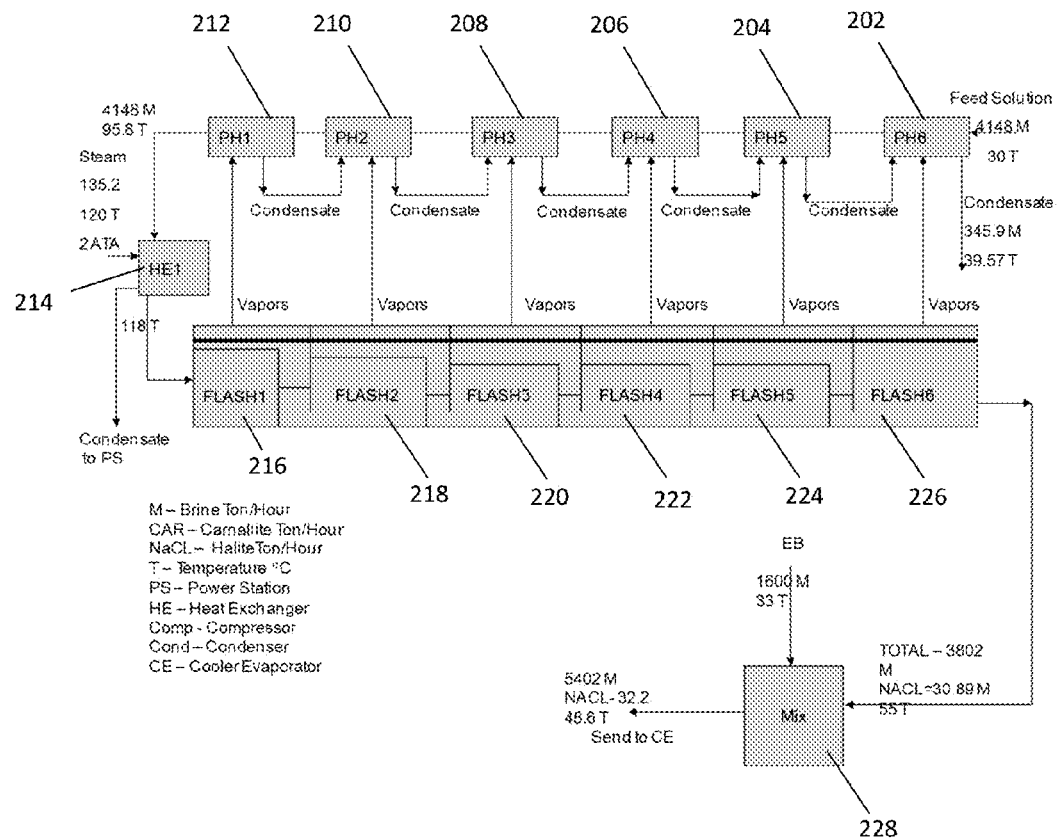
FIGS. 2 and 3 demonstrate a flow chart describing a process utilizing a flash condenser series with brine mix at the end and utilizing cooler evaporator(s) for precipitating Carnallite, according to some embodiments of the present invention.
Figure 3:
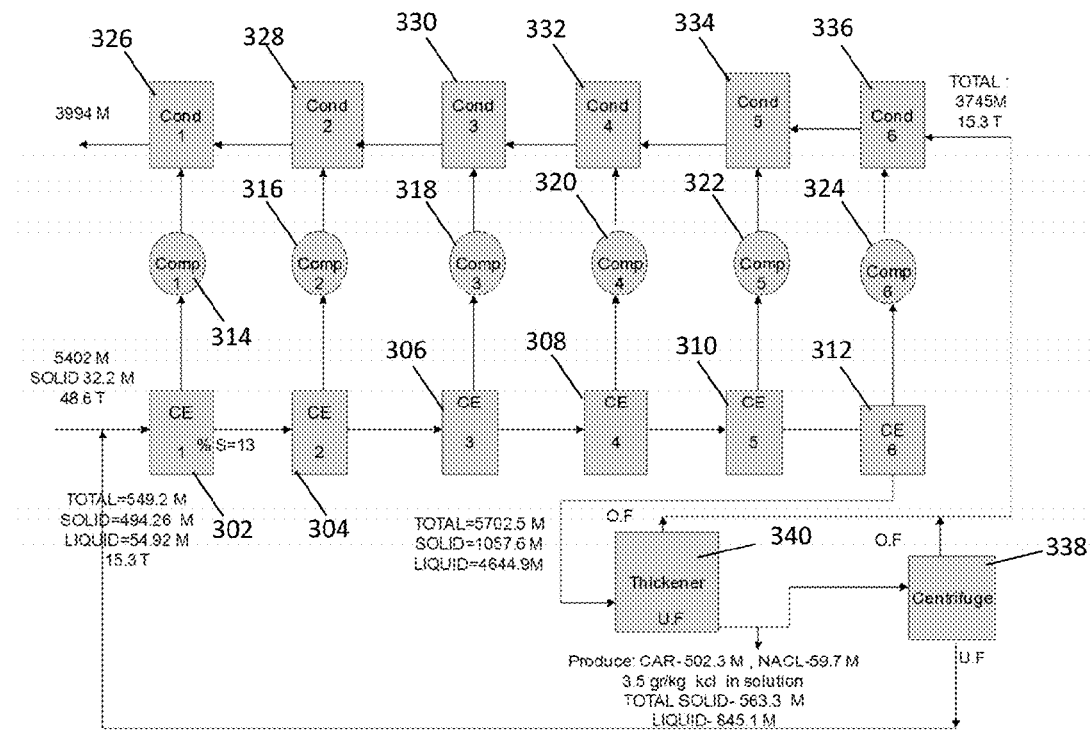

Reference is made to FIG. 2 and FIG. 3 which describe a process for utilizing a flash condenser series with brine mix at the end and utilizing cooler evaporator(s) for precipitating Carnallite in accordance with some demonstrative embodiments described herein.

As shown in FIG. 2, an F1 and F2 solution is fed to Heat Exchanger (HE) 202 at a temperature of 30° C. and at a rate of 4148 Ton/Hour. The solution is further fed through Heat Exchangers 204, 206, 208, 210 and 212 in order to heat the solution to a temperature of 95.8° C., wherein vapors from Flashers 216, 218, 220, 222, 224 and 226 provide heat to Heat Exchangers 204, 206, 208, 210 and 212.

The heated F1 and F2 solution at a temperature of 95.8° C. is fed to yet another Heat Exchanger 214, which heats the F1 and F2 solution using steam having 2 ATA and 120° C.

The F1 and F2 solution leaves HE 214 at a temperature of 118° C. and is fed through a series of flashers 216, 218, 220, 222, 224 and 226, in which the pressure of the solution is gradually reduced, and water is evaporated (the evaporated water provides heat to Heat Exchangers 204, 206, 208, 210 and 212 as described above).

The F1 and F2 solution leaves Flasher 226 at a temperature of 55° C., whereas at this stage 12% of the water from the solution has evaporated during the process, and the solution is mixed in Mixer 228 with a solution from the ponds (also known as "End Brine" solution or "EB solution", which is rich in $MgCl_2CaCl_2$). The mixing results in a "base solution", having increased concentrations of Magnesium and $CaCl_2$, and accordingly a higher potential for Carnallite precipitation.

Reference is now made to FIG. 3, which demonstrates that the base solution is fed through a series of cooler evaporators ("CE") 302, 304, 306, 308, 310 and 312, wherein the base solution is exposed to reduction in pressure and is cooled to a temperature of 15° C., and Carnallite begins to precipitate.

During the transfer of the base solution through CEs 302, 304, 306, 308, 310 and 312 vapors are formed due to the reduction in pressure, and the vapors are transferred to Compressors 314, 316, 318, 320, 322 and 324, respectively.

Compressors 314, 316, 318, 320, 322 and 324 raise the temperature and pressure of the vapors from CEs 302, 304, 306, 308, 310 and 312.

The vapors are further transferred to condensers 336, 334, 332, 330, 328 and 326, and as explained below, are condensed with the overflow of thickener 340 and centrifuge 338.

The resulting solution, leaving from CE 312 then undergoes a process of thickening and separation using thickener 340.

From thickener 340 there are two outputs: a thickener 340 overflow resultant, i.e., the liquid solution which consists the upper flowing layer in a separation process; and a thickener 340 underflow resultant, i.e., the precipitated solution which consists the lower layer in a separation process.

The underflow of thickener 340 is divided into two portions. According to some embodiments, the portions are divided in a manner which will enable the solid yield of 13% materials when the base solution is fed to CE 302 due to crystallization, as explained below.

A first portion of the underflow of thickener 340 is the process's output and includes the following:
"EBF" solution, including KCL at about 3.5 g/kg w/w of the solution.
Carnallite at a rate of 502.3 ton/hour
NaCl, at a rate of 59.7 ton/hour A second portion of the underflow of thickener 340 is fed to a centrifuge 338 to enable further separation. From centrifuge 338 there are two outputs: a centrifuge 338 overflow resultant, i.e., the liquid solution which consists the upper flowing layer in a separation process; and a centrifuge 338 underflow resultant, i.e., the precipitated solution which consists the lower layer in a separation process.

The thickener 340 overflow resultant and the centrifuge 338 overflow resultant are fed through the series of condensers 336, 334, 332, 330, 328 and 326, and enable the condensation of vapors from compressors 324, 322, 320, 318, 316 and 314 respectively.

The condensation of vapors in condensers 336, 334, 332, 330, 328 and 326 enables the entire system to remain in vacuum.

The centrifuge 338 underflow resultant is added to the base solution which is fed through the series of CEs 302, 304, 306, 308, 310 and 312. As described above, the addition of the centrifuge 338 underflow resultant to the base solution upon feeding into CE 302 may assist in crystallization, and solidification of the Carnallite.

While this invention has been described in terms of some specific examples, many modifications and variations are possible. It is therefore understood that within the scope of the appended claims, the invention may be realized otherwise than as specifically described.

The invention claimed is:

1. A process for extracting Carnallite from an aqueous solution, the process comprising steps of
   i) pre-heating the solution comprising said Carnallite in a series of at least two heat exchangers, thereby obtaining a pre-heated solution; and
   ii) concentrating said pre-heated solution in a series of at least two evaporation units, whereby forming a concentrated solution and hot vapors;
   wherein at least one of said evaporation units employs steam for indirect heating, and wherein at least one of said heat exchanger units employs the heat of said hot vapors formed in said evaporation units.

2. A process according to claim 1, wherein said concentrated solution provides a product of Carnallite and said hot vapors provide water.

3. A process according to claim 1, wherein said vapors from at least one evaporation unit are further fed through one or more compressors.

4. A process according to claim 1, wherein said vapors from at least one evaporation unit are further fed through one or more compressors.

5. A process according to claim 4, wherein said vapors are further fed through one or more condensers to heat a at least one solution.

6. A process according to claim 5, wherein said at least one solution is fed through said one or more condensers separately from said vapors.

7. A process according to claim 6, wherein said at least one solution is a Carnallite brine solution.

8. A process according to claim 1, wherein at least one heat exchanger in said series of at least two heat exchangers is fed with steam from a power station.

9. A process according to claim 8, wherein steam is at 2 Atmospheres Absolute (ATA) and 120° C.

10. A process for extracting Carnallite from an aqueous solution, the process comprising steps of
    i) pre-heating the solution comprising said Carnallite in a series of at least two heat exchangers, thereby obtaining a pre-heated solution; and
    ii) concentrating said pre-heated solution in a series of at least two flashers, whereby forming a concentrated solution and hot vapors; and
    iii) feeding the concentrated solution through a series of at least two cooler evaporators to provide a cool concentrated solution;
    iv) precipitating Carnallite from said cool concentrated solution.

11. The Process of claim 10, wherein said concentrated solution is mixed with an End Brine (EB) solution prior to being fed through said series of at least two cooler evaporators.

12. The Process of claim 10, wherein said cool concentrated solution is further fed through a thickener, to provide an overflow resultant and an underflow resultant.

13. The Process of claim 12, wherein said Carnallite is precipitated from said underflow resultant.

14. The Process of claim 12, wherein said overflow resultant is added to said concentrated solution prior to feeding said concentrated solution through said series of at least two cooler evaporators.

* * * * *